(12) United States Patent
Chiu

(10) Patent No.: US 11,449,157 B2
(45) Date of Patent: Sep. 20, 2022

(54) WHEEL DEVICE WITH FAST SCROLLING MODULE

(71) Applicant: CORSAIR MEMORY, INC., Fremont, CA (US)

(72) Inventor: I-Ning Chiu, Taipei (TW)

(73) Assignee: Corsair Memory, Inc., Milpitas, CA (US)

( * ) Notice: Subject to any disclaimer, the term of this patent is extended or adjusted under 35 U.S.C. 154(b) by 0 days.

(21) Appl. No.: 17/106,097

(22) Filed: Nov. 28, 2020

(65) Prior Publication Data

US 2021/0165507 A1 Jun. 3, 2021

(30) Foreign Application Priority Data

Nov. 28, 2019 (TW) .................................. 108143450

(51) Int. Cl.
 *G06F 3/0362* (2013.01)
 *G06F 3/0354* (2013.01)

(52) U.S. Cl.
 CPC ........ *G06F 3/0362* (2013.01); *G06F 3/03543* (2013.01)

(58) Field of Classification Search
 CPC .. G06F 3/0312; G06F 3/0362; G06F 3/03543; G06F 3/03541
 See application file for complete search history.

(56) References Cited

U.S. PATENT DOCUMENTS

| 2007/0146324 | A1* | 6/2007 | Blandin | G06F 3/03543 345/163 |
| 2009/0303182 | A1* | 12/2009 | Wu | G06F 3/0362 345/163 |
| 2011/0227828 | A1* | 9/2011 | Blandin | G06F 3/03543 345/163 |
| 2018/0275776 | A1* | 9/2018 | Li | G06F 3/03543 |

* cited by examiner

*Primary Examiner* — Hang Lin
(74) *Attorney, Agent, or Firm* — Carina M. Tan; Corsair Memory, Inc.

(57) ABSTRACT

A wheel device with fast scrolling module, comprises a fixing unit, a wheel unit, and a mobile unit. The wheel unit includes a wheel disposed on the fixing unit, and a ratchet tooth surface disposed on the wheel. The wheel rotates relative to a first bracket. The mobile unit is translated relative to the wheel unit, including a moving body disposed on the fixing unit, and an elastic supportive body disposed on the moving body. The mobile unit is movable between a first position and a second position. When the mobile unit is at the first position, the elastic supportive body touches the ratchet tooth surface, so that the wheel unit switches to ratchet mode. When the mobile unit is at the second position, the elastic supportive body is separated from the ratchet tooth surface, so that the wheel unit switches to free-spin mode.

9 Claims, 11 Drawing Sheets

WHEEL DEVICE WITH FAST SCROLLING MODULE

CROSS REFERENCE TO RELATED APPLICATIONS

This application claims the benefit of priority to Taiwanese patent application no. 108143450 filed Nov. 28, 2019 entitled "Wheel Device with Fast Scrolling Module", the contents of which are incorporated herein by reference in their entirety for all purposes.

TECHNICAL FIELD

The present invention relates to a wheel device for a computer mouse, more particularly to a wheel device with fast scrolling module.

DETAILED DESCRIPTION

Figure 1:
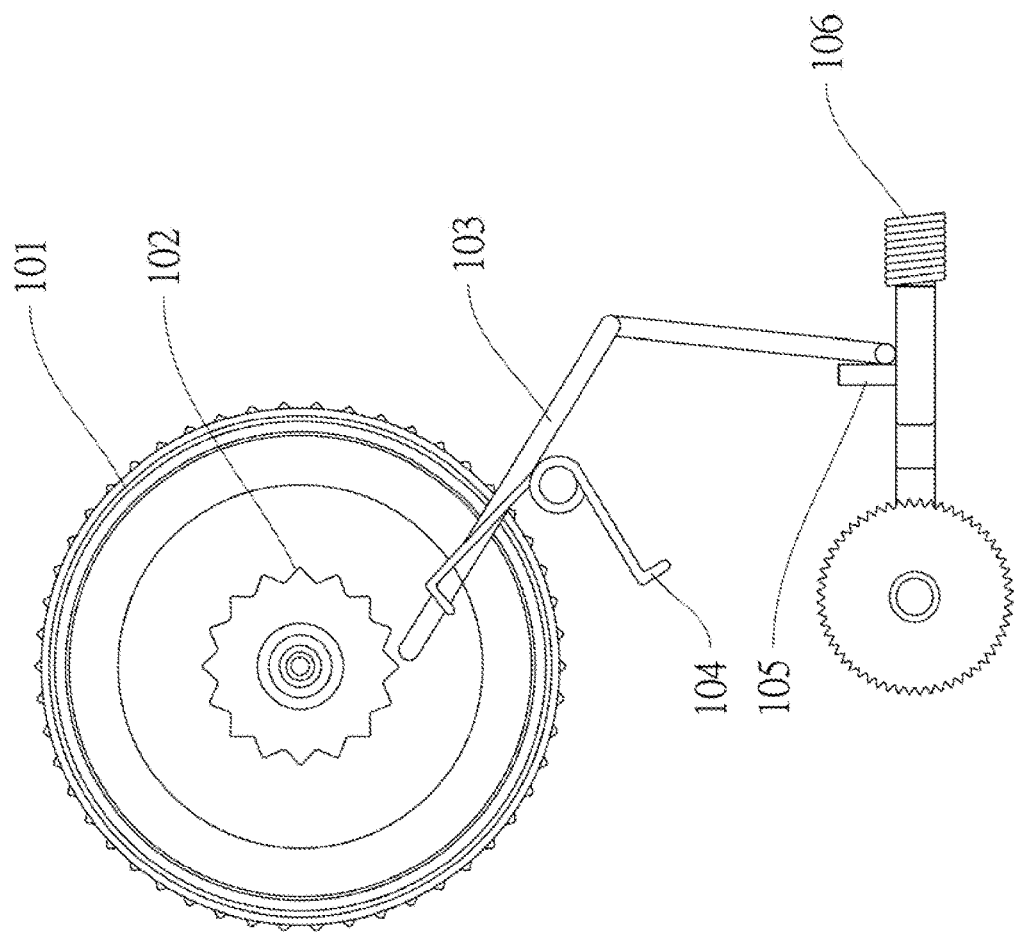
FIG. 1 is a cross-sectional view of a mouse wheel structure disclosed in Chinese Patent Publication No. CN 108628479 A.

A scroll wheel structure is usually arranged on a standard computer mouse for scrolling up and down a webpage, and discrete detents are set in the scroll wheel structure, so that the user will feel resistance when scrolling which is used to control the angle of the scrolling, and furthermore is used to control the number of lines or pages of webpages.

Please refer to the Chinese Patent Publication No. CN 108628479A "Mouse wheel structure" comprising a roller 101, a gear tooth surface 102 set in the roller 101, a detachable lever 103 connected to the gear tooth surface 102, a first elastic member 104 connected to the lever 103, an adjustment block 105 connected to the lever 103, and a second elastic member 106 pushed against the second elastic member 106.

The first elastic member 104 applies an elastic force to the lever 103 which is pushed against the gear tooth surface 102. The adjustment block 105 can adjust the position of the lever 103, so the pressing force of the lever 103 on the gear tooth surface 102 can be controlled, and furthermore the resistance of the wheel scrolling can be adjusted. Besides, when the lever 103 is separated from the gear tooth surface 102, the roller 101 will turn to a free-spin mode, so that the roller 101 can scroll freely without resistance. The second elastic member 106 is configured to apply an elastic force to the adjustment block 105.

Therefore, the following drawbacks and disadvantages still exist with prior art invention:

A conventional mouse is provided with a function of controlling a switching component by flicking the wheel. The prior art wheel structure adjusts the rolling resistance by controlling the position of the lever 103 in a manner perpendicular to the gear tooth surface 102. The stronger the force of the gear tooth surface 102, the greater the rolling resistance of the roller 101, and vice versa. Therefore, the position of the roller 101 must match the position of the lever 103 and cannot be changed at will. It is obvious that the function of flicking a wheel to control a switching component is not able be obtained by the prior art wheel structure.

In the wheel structure with discrete detents, the lever 103 itself has no elastic force, so it needs to rely on the pressing force applied from the first elastic member 104 to push against the gear tooth surface 102. Then, the position of the adjustment block 105 is controlled by the structure of the rotating button. Therefore, the structure of the roller is too complicated, and its adjustment is not easy, so that it is not possible to switch quickly between ratchet mode and free-spin mode.

If the position of the adjustment block 105 is controlled by the rotating structure, the elastic force of the first elastic element 104 and the second elastic element 106 must be resisted. Especially, when the roller structure turns to the free-spin mode, the first elastic element 104 and second elastic element 106 are compressed to the tightest position, so it will take much more effort to adjust the lever 103.

Therefore, it is desirable to provide a simple wheel structure which can be switched between the free-spin mode and ratchet mode quickly and easily, and retains the function of controlling the switching components.

Therefore, a feature of an embodiment of the present invention is to provide a wheel device, comprising a fixing unit, a wheel unit and a mobile unit.

The fixing unit includes a fixing base, a first bracket connected to the fixing base, and a second bracket connected to the first bracket.

The wheel unit includes a wheel disposed on the first bracket, and a ratchet tooth surface disposed on one side of the wheel, and the wheel rotates relative to the first bracket The mobile unit translates relative to the wheel unit, which includes a moving body disposed on the second bracket, and an elastic supportive body disposed on the moving body. The mobile unit moves between a first position and a second position. When the mobile unit moves to the first position, the elastic supportive body touches the ratchet tooth surface. When the mobile unit moves to the second position, the elastic supportive body is separated from the ratchet tooth surface.

Another technique of an embodiment of the present invention is that the second bracket has a first partition, a second partition spaced from the first partition, and at least one horizontal rod disposed between the first partition and the second partition. The horizontal rod penetrates the second partition and protrudes, and the moving body is disposed on the horizontal rod.

Another technique of an embodiment of the present invention is that the moving body is provided with a first moving portion disposed between the first partition and the second partition, a second moving portion disposed on the outside of the second partition, a connecting portion connected to the first and second moving portion, at least one first hole disposed on the first moving portion, and at least one second hole disposed on the second moving portion. The horizontal rod passes through the first and second holes, and the elastic supportive body is disposed on the second moving portion.

Another technique of an embodiment of the present invention is that the second bracket is further provided with a translation space defined by the first partition and the second partition. The width of the first moving portion is smaller than the width of the translation space, so that the first moving portion disposed on the horizontal rod is slidable in the translation space, and the elastic supporting body disposed on the second moving portion is moved synchronously with the first moving portion by the connecting portion disposed between the first moving portion and the second moving portion mobile.

Another technique of an embodiment of the present invention is that the present invention further comprises a positioning unit, which includes a first fixing group disposed on the second bracket, and a second fixing group disposed on the first moving portion, wherein the first and second fixing groups are used for positioning the moving body.

Another technique of an embodiment of the present invention is that the first fixing group is provided with a first magnetic member disposed on the second bracket, and a second magnetic member disposed on the second bracket and spaced apart from the first magnetic member. The second fixed group is provided with a third magnetic member disposed on the first moving portion. When the mobile unit is at the first position, the first magnetic member and the third magnetic member are attracted and fixed together, when the mobile unit is at the second position, the second magnetic member and the third magnetic member are attracted and fixed together.

Another technique of an embodiment of the present invention is that the second fixing group is further provided with a notch disposed on the first moving portion, the notch is configured to contain the third magnetic member, and the width of the notch is greater than the width of the third magnetic member, so that the third magnetic member is slidable in the notch.

Another technique of an embodiment of the present invention is that the fixing unit further includes a pressing seat connected to the second bracket, a convex body disposed on the pressing seat, and a spring body connected to the pressing seat, wherein the convex body is used to press against a switch, and when the spring body applies an elastic force on the pressing seat, the convex body is separated from the switch.

Another technique of an embodiment of the present invention is that a recess is disposed on a side of the wheel, and a circular protrusion disposed in the recess. The ratchet tooth surface is disposed on an outer edge of the circular protrusion.

Another technique of an embodiment of the present invention is that the tooth surface is provided with a plurality of convex portions arranged at intervals, and a plurality of concave portions respectively disposed among the plural convex portions. A side of circular protrusion is provided with a plurality of guiding ridges which are radially disposed, and the position of the guiding ridge is matched with the position of the plural convex portions. A bending section is extended from the end of the elastic supportive body, which is used to push against the guiding ridge of the convex portion when the elastic supportive body moves from the second position to the first position, so that the elastic supportive body is guided to the concave portion of the ratchet tooth surface.

One advantage of the present invention is that the mobile unit translates between the first position and the second position relative to the wheel unit, wherein the translation function is provided by the second bracket structure in a horizontal rod structure. The structure is simple and can provide a fast switching between ratchet mode and free-spin mode. The elastic supporting body leaves the ratchet tooth surface in a translational manner, and when flicking the wheel, it will not be interfered by the elastic supporting body. Therefore, flicking the wheel can press on the fixing unit, so that the wheel device with fast scrolling module is able to provide the function of controlling a switch.

The features and technical contents of this invention will be clearly presented with detailed descriptions and drawings of the following three preferred embodiments.

Figure 2:
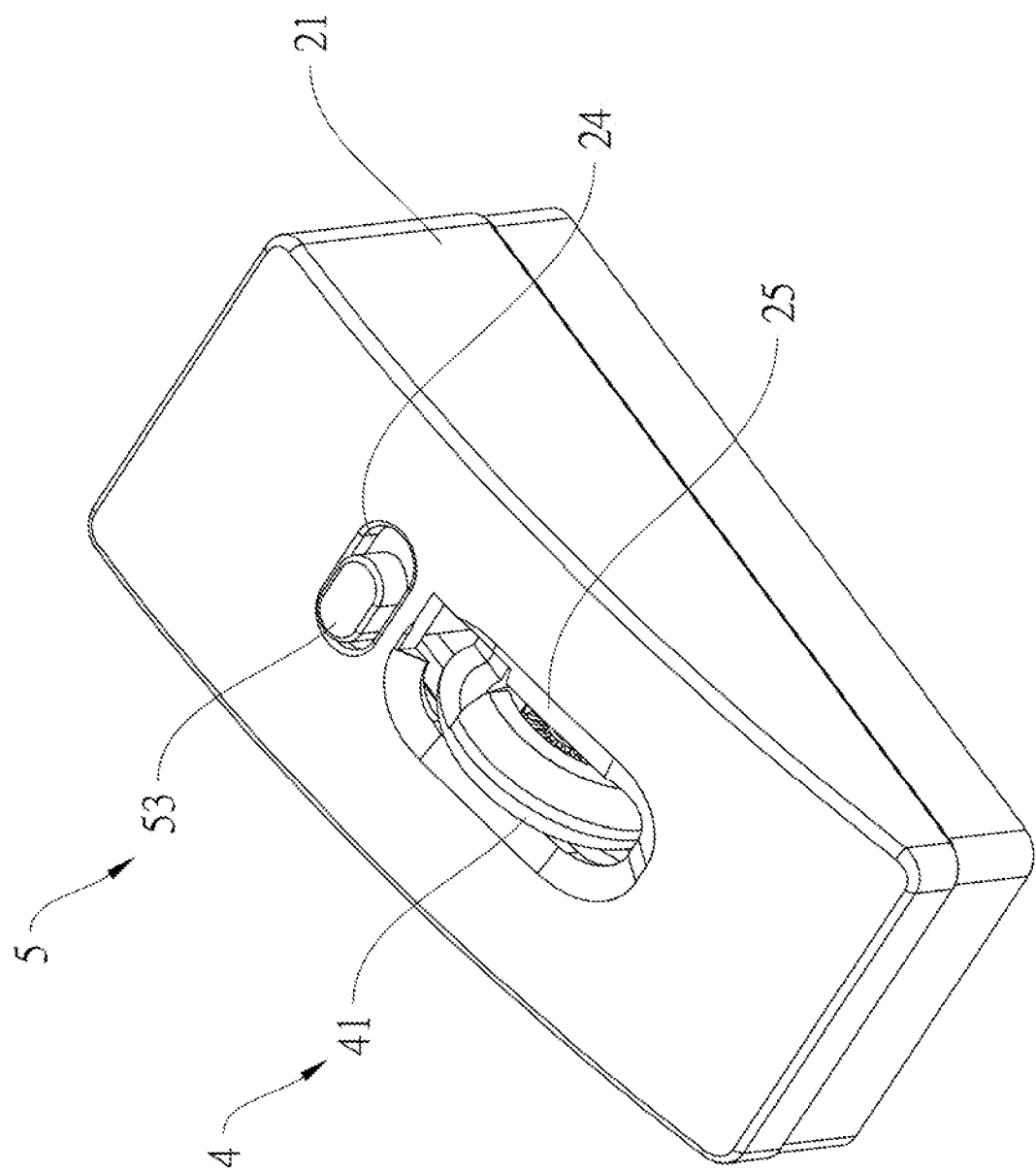
FIG. 2 is a perspective view illustrating a wheel device with fast scrolling module disposed in a housing in a preferred embodiment according to the present invention.
Figure 3:
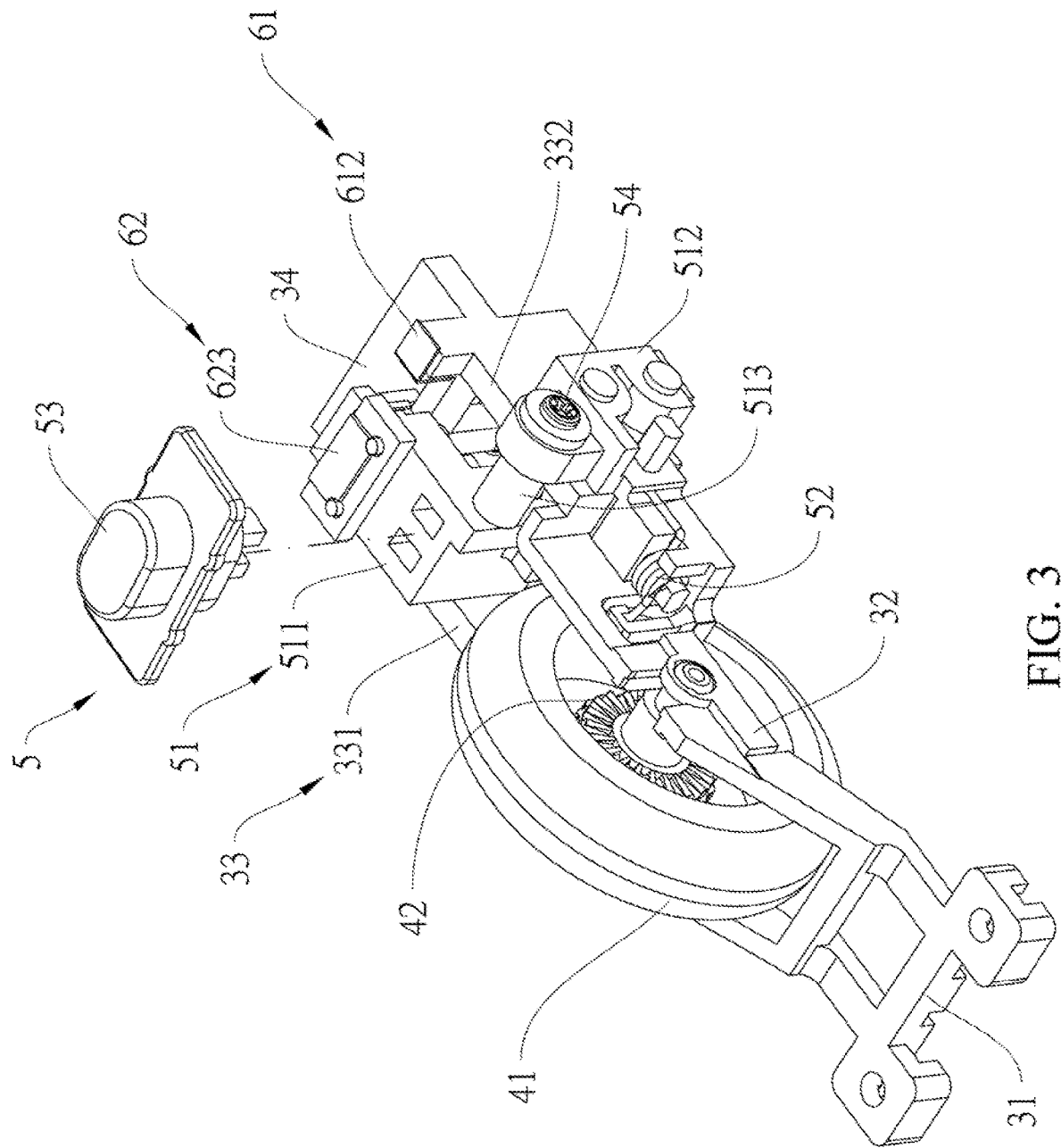
FIG. 3 is a perspective view illustrating a quick switching of free-spin mode.
Figure 4:
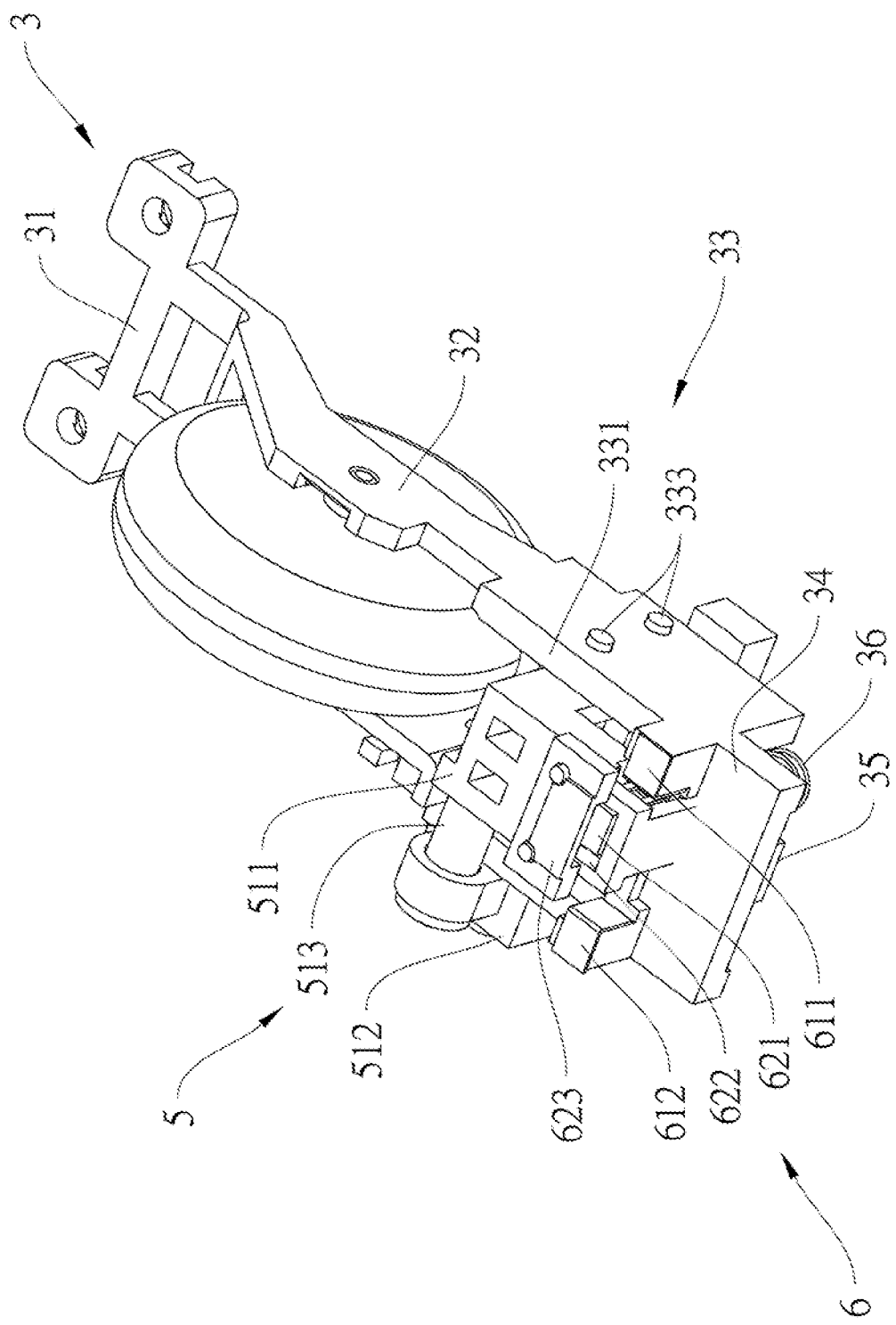
FIG. 4 is a perspective view illustrating a quick switching of free-spin mode.

With reference to FIGS. 2, 3, and 4, a preferred embodiment according to the present invention is depicted, comprising a fixing unit 3, a wheel unit 4, a mobile unit 5, and a positioning unit 6.

The wheel device with fast scrolling module is disposed in a housing 21. The housing 21 is provided with a first opening 24 which is used to expose the wheel unit 4, and a second opening 25 which is used to expose a mode shift button 53 of the mobile unit 5, so that the wheel unit 4 can switch between ratchet mode and free-spin mode. During implementation, the housing 21 can be a mouse outer shell, so that the wheel device with fast scrolling module can control the computer, and so should not be construed as limiting the invention. Since the technology of controlling the computer by the scroll wheel is conventional, and it will not be described in detail here.

Figure 5:
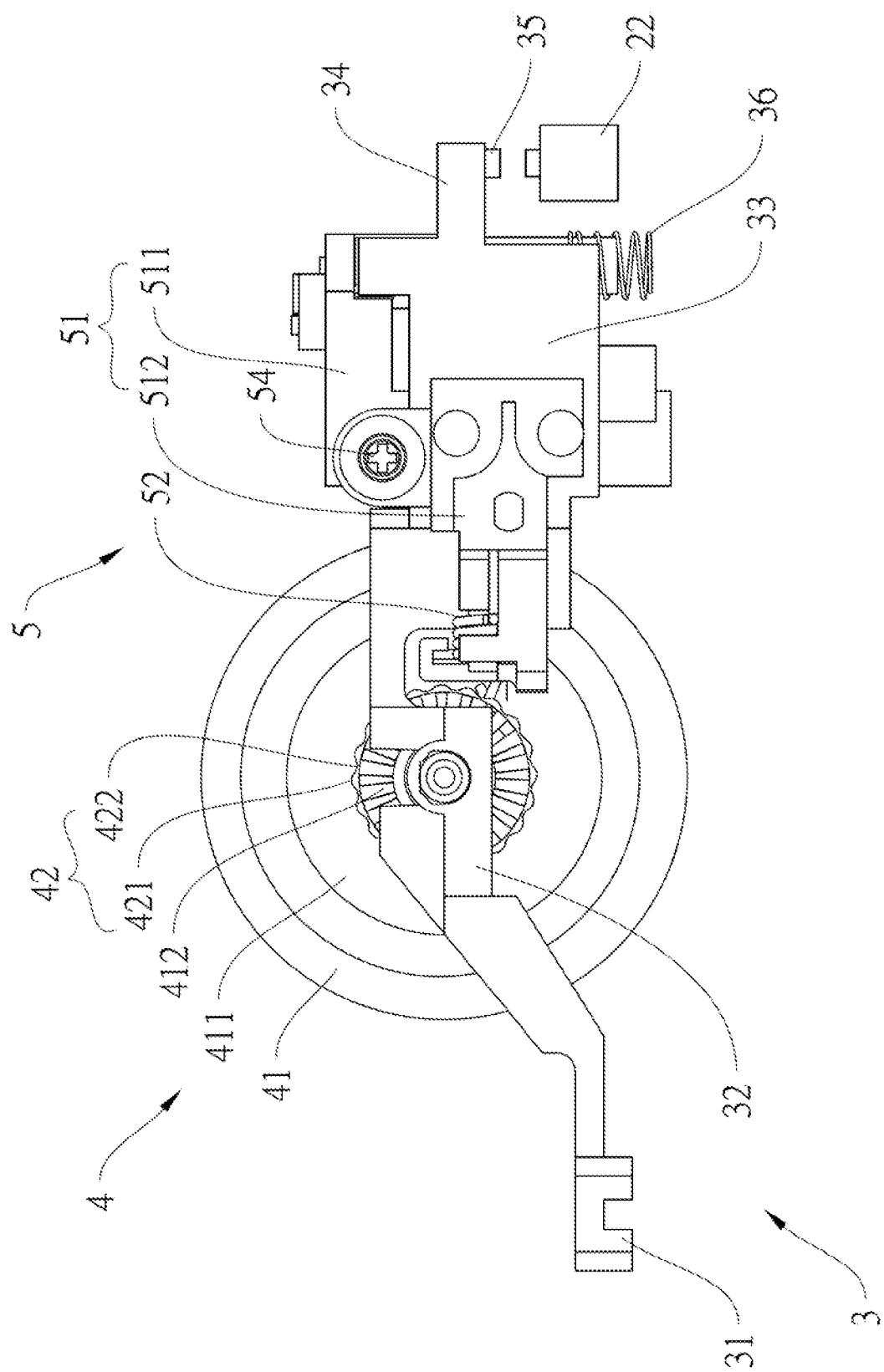
FIG. 5 is a cross-sectional view illustrating a quick switching of free-spin mode.

With reference to FIG. 5, the fixing unit 3 includes a fixing base 31, a first bracket 32 connected to the fixing base 31, a second bracket 33 connected to the first bracket 32, a pressing seat 34 connected to the second bracket 33, a convex body 35 disposed on the pressing seat 34, and a spring body 36 connected to the pressing seat 34.

The convex body is used to press against a switch, and the spring body 36 applies an elastic force on the pressing seat 34, so that the convex body 35 will be separated from the switch 22. The fixing base 31 is provided with two locking holes for being fastened in the housing 21. During implementation, the fixing base 31 can be a buckle structure and fixed in the housing 21, and so should not be construed as limiting the invention.

Figure 6:
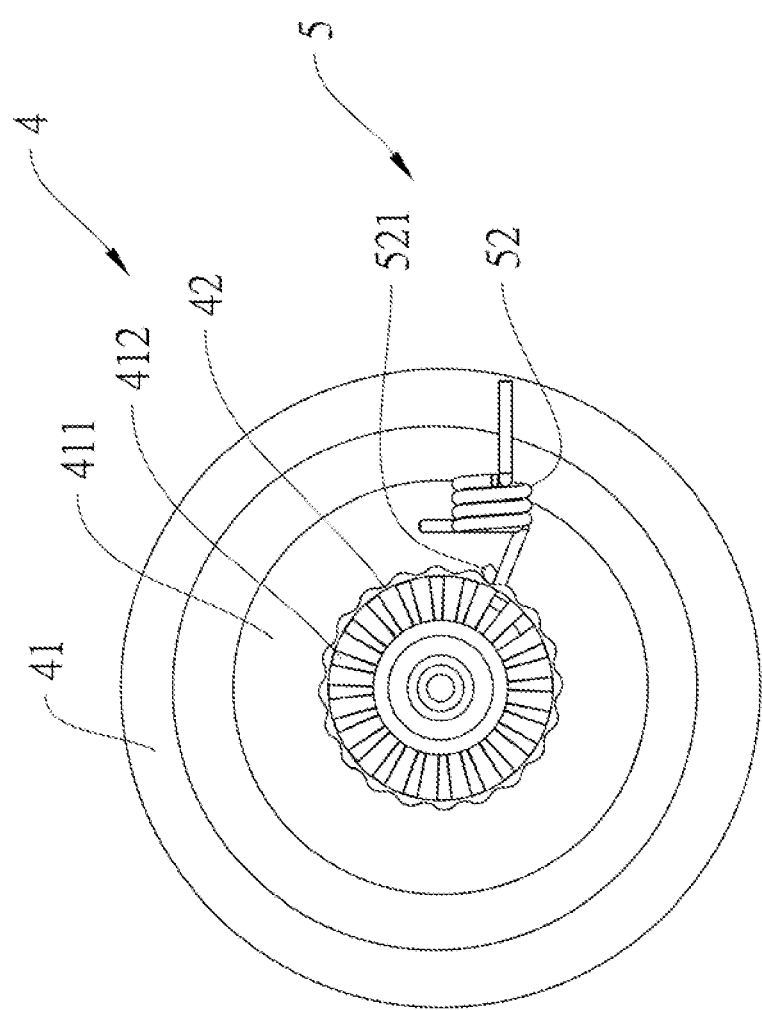
FIG. 6 is a cross-sectional view illustrating a wheel unit and an elastic supportive body in the preferred embodiment.
Figure 7:
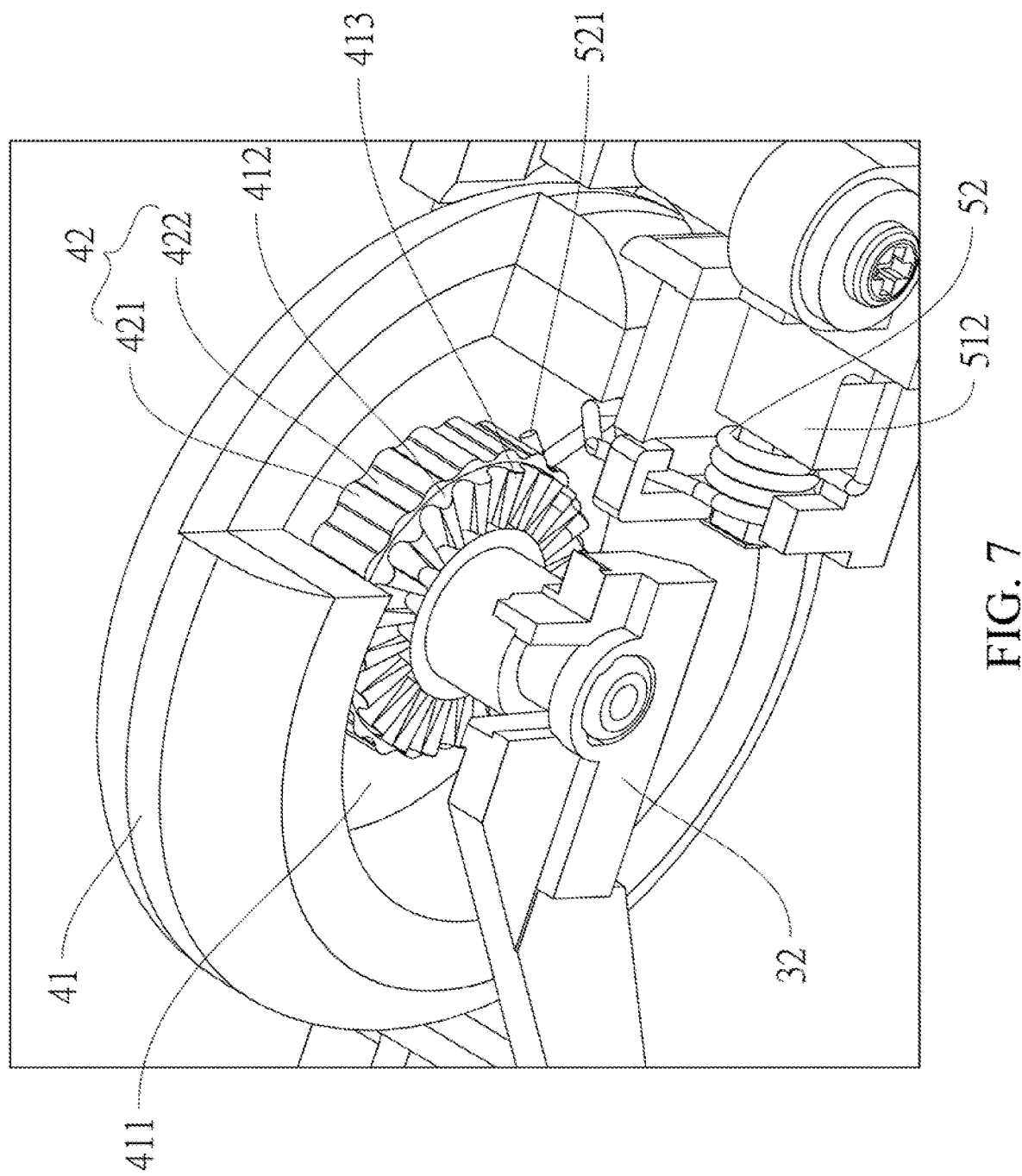
FIG. 7 is a perspective view illustrating the wheel unit and the elastic supportive body in the preferred embodiment.
Figure 8:
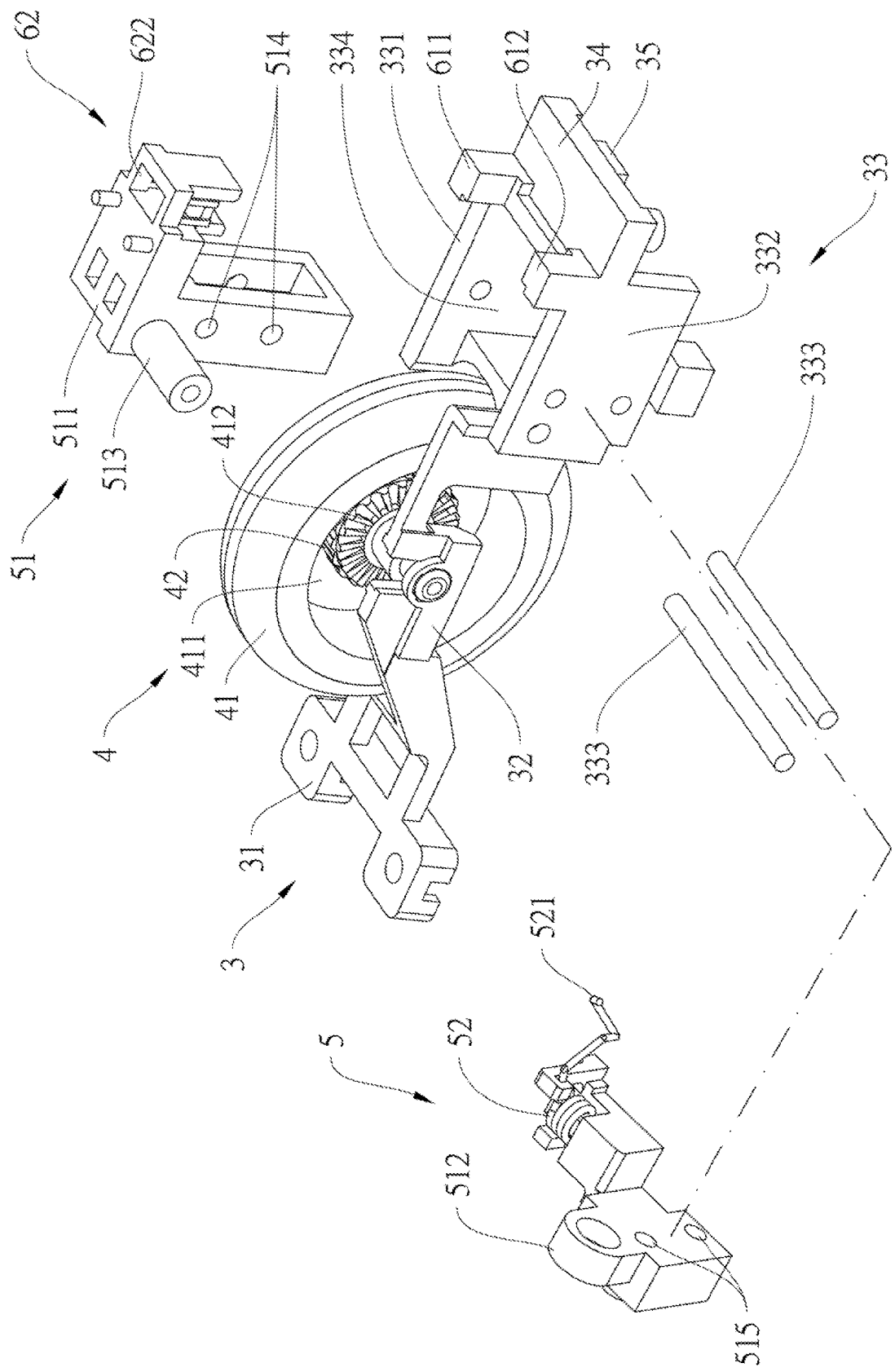
FIG. 8 is an exploded view illustrating a fixing unit and a mobile unit in the preferred embodiment.
Figure 9:
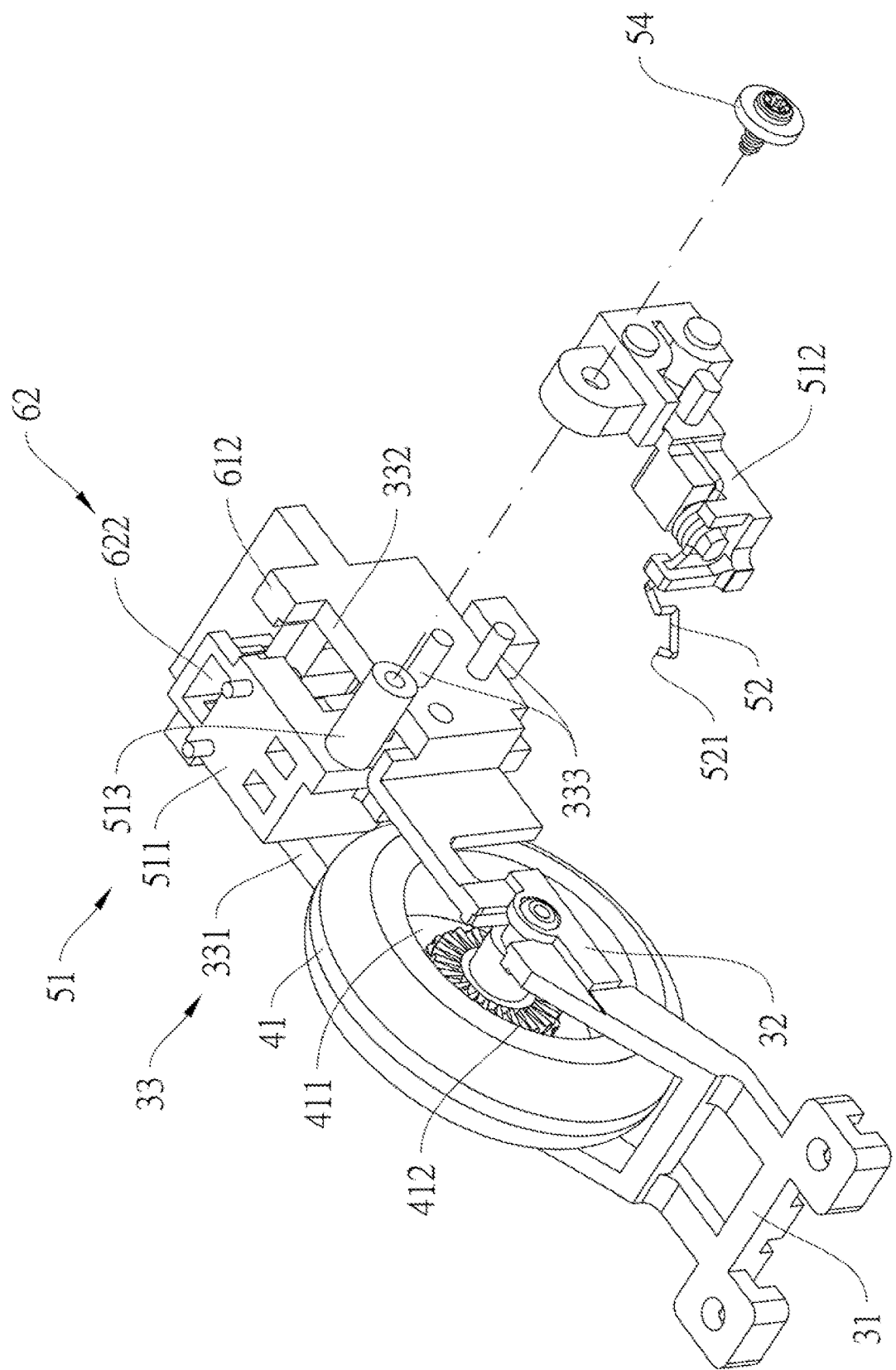
FIG. 9 is an exploded view illustrating the fixing unit and the mobile unit in the preferred embodiment.

With reference to FIGS. 6 and 7, the wheel unit 4 includes a wheel 41 disposed on the first bracket 32, and a ratchet tooth surface 42 disposed on one side of the wheel 41. The wheel 41 rotates relative to the first bracket 32. A recess 411 is disposed on a side of the wheel 41, and a circular protrusion 412 disposed in the recess 411. The ratchet tooth surface 42 is disposed on an outer edge of the circular protrusion 412. During implementation, the first bracket 32 is provided with two side plates, and the wheel 41 is pivotally connected to the two side plates, and rotates between the two side plates.

The ratchet tooth surface 42 is provided with a plurality of convex portions 421 arranged at intervals, and a plurality of concave portions 422 respectively disposed between the plurality of convex portions 421. A side of circular protrusion 412 is provided with a plurality of guiding ridges 413 which are radially disposed, and the position of the guiding ridge 413 is matched with the position of the plural convex portions 421. A bending section 521 is extended from the end of the elastic supportive body 52, and the bending section 521 is used to push against the guiding ridge 413 of the convex portion 421 when the elastic supportive body 52 moves from the second position to the first position, so that the elastic supportive body 52 is guided to the concave portion 422 of the ratchet tooth surface 42

With reference to FIGS. 8, 9, 10, and 11, the mobile unit 5 translates relative to the wheel unit 4, including a moving body 51 disposed on the second bracket 33, and an elastic supportive body 52 disposed on the moving body 51.

The positioning unit 6 includes a first fixing group 61 disposed on the second bracket 33, and a second fixing group 62 disposed on the first moving portion 511. The first and second fixing groups 61, 62 are used for positioning the moving body 51. The mobile unit 5 moves in a translation direction relative to the fixing unit 3 and the wheel unit 4.

The mobile unit 5 moves between a first position and a second position, when the mobile unit 5 moves to the first position, the elastic supportive body 52 touches the ratchet tooth surface 42; when the mobile unit 5 moves to the second position, the elastic supportive body 52 is separated from the ratchet tooth surface 42.

The second bracket 33 is provided with a first partition 331, a second partition 332 spaced from the first partition 331, at least one horizontal rod 333 disposed between the first partition 331 and the second partition 332, and a translation space 334 defined by the first partition 331 and the second partition 332. The horizontal rod 333 penetrates the second partition 332 and protrudes, and the moving body 51 is disposed on the horizontal rod 333.

The moving body 51 is provided with a first moving portion 511 disposed between the first partition 331 and the second partition 332, a second moving portion 512 disposed on the outside of the second partition 332, a connecting portion 513 connected to the first and second moving portion 511, 512, at least one first hole 514 disposed on the first moving portion 511, and at least one second hole 515 disposed on the second moving portion 512. The horizontal rod 333 passes through the first and second holes 514, 515, and the elastic supportive body 52 is disposed on the second moving portion 512. A notch is disposed on top of the first moving portion 511 for the configuration of the mode shift button 53, so that controlling the mode shift button 53 can also control the position of the mobile unit 5.

The width of the first moving portion 511 is smaller than the width of the translation space 334, so that the first moving portion 511 disposed on the horizontal rod 333 is slidable in the translation space 334 in a translation direction 23. The elastic supporting body 52 disposed on the second moving portion 512 is moved synchronously with the first moving portion 511 by the connecting portion 513 disposed between the first moving portion 511 and the second moving portion mobile 512.

The mobile unit 5 is confined by the first partition 331 and the second partition 332, and the translation direction 23 of the mobile unit 5 is confined by the horizontal rod 333, so the first moving portion 511 is slidable in the translation space 334 in the translation direction 23. The connecting portion 513 is protruded from the first moving portion 511, and the second moving portion 512 is fastened to the connecting portion 513 by a locking screw 54, so that the elastic supporting body 52, the first moving portion 511, the connecting portion 513, and the second moving portion 512 are moved synchronously in the translation direction 23.

The first fixing group 61 is provided with a first magnetic member 611 disposed on the second bracket 33, and a second magnetic member 612 disposed on the second bracket 33 and spaced apart from the first magnetic member 611. The second fixed group 62 is provided with a third magnetic member 621 disposed on the first moving portion 511, and a notch 622 disposed on the first moving portion 511.

The notch 622 is configured to contain the third magnetic member 621, and the width of the notch 622 is greater than the width of the third magnetic member 621, so that the third magnetic member 621 is slidable in the notch 622.

When the mobile unit 5 is at the first position, the first magnetic member 611 and the third magnetic member 621 are attracted and fixed together. When the mobile unit 5 is at the second position, the second magnetic member 612 and the third magnetic member 621 are attracted and fixed together. Preferably, the opening of the notch 622 is provided with a cover 623, so that the third magnetic member 621 can be prevented from falling from the notch 622.

In the preferred embodiment, the first magnetic member 611 and the second magnetic member 612 are iron pieces, which can be attracted by the magnet. The third magnetic member 621 is a magnet and can be attached by the iron piece. During implementation, the first magnetic member 611 and the second magnetic member 612 can be magnets, and the third magnetic member 621 can be an iron block, and so should not be construed as limiting the invention. Preferably, two protrusions are arranged at intervals on the second bracket 33, and the first magnetic member 611 and the second magnetic member 612 are disposed on the two protrusions.

In addition, the first fixing group 61 may also be divided into two and respectively disposed on the concave edge of the fixing unit 3, and the second fixing group 62 may also be elastic and disposed on the convex edge of the moving unit 5. The convex edge can match the concave edge to fasten the moving unit 5. Due to the variety of the buckle structure applied in the fixed position, the details are not described herein.

With reference to FIGS. 2 and 5, the fixing base 31, the first bracket 32, the second bracket 33, the pressing seat 34 and the convex body 35 of the fixing unit 3 are integrally formed. The switch 22 is disposed in the housing 21, and the fixing base 31 of the fixing unit 3 is disposed in the housing 21, the convex body 35 is disposed above the switch 22. The spring body 36 provides an elastic force to raise the pressing seat 34, so that convex body 35 is separated from the switch 22. The wheel unit 4 is disposed on the first bracket 32, and the moving unit 5 is disposed on the second bracket 33, so either flicking the wheel 41 of the wheel unit 4 or pressing the mode shift button 53 of the mobile unit, the convex body 35 disposed on the pressing seat 34 can be pressed down and pressed against the switch 22.

It is worth mentioning that the conventional mouse without the free-spin mode has the function to control a switch by flicking the wheel. However, the wheel in the conventional mouse with the free-spin mode is unable to control a switch due to the mode shift structure. Therefore, the conventional mouse with free-spin mode cannot control a switch by flicking the wheel. In contrast, the present invention can use the wheel 41 to press on the switch 22, furthermore the mode shift button 53 is also can be used to press on the switch 22.

With reference to FIGS. 6 and 7, the end of the elastic supporting body 52 is matched with the concave portion 422 of the tooth surface 42, so when the moving unit 5 is located at the first position, the end of the elastic supporting body 52 can support the concave portion 422 of the ratchet tooth surface 42. When the wheel 41 is rotated, the elastic supporting body 52 will press against and pass through the convex portion 421 of the ratchet tooth surface 42, and reach the concave portion 422 of the other ratchet tooth surface 42, wherein the force applied from the elastic supporting body 52 on the convex portion 421 of the ratchet tooth surface 42 fastens the rotational angle of the wheel 41 and provides ratchet mode. When the moving unit 5 is located at the second position, the elastic supporting body 52 is separated from the ratchet tooth surface 42, so that the wheel 41 rotates without resistance, and the free-spin mode can be provided.

The height of the end of the bending section 521 of the elastic supporting body 52 is higher than the height of the convex portion 421 of the tooth surface 42, so that the moving unit 5 can successfully enter the first position from the second position. For example, when the end of the elastic supporting body 52 is aligned with the concave portion 422 of the ratchet tooth surface 42, the elastic supporting body 52 definitely can enter the concave portion 422 of the ratchet tooth surface 42. However, the free-spin mode provided by the second position is not able to fix the rotational angle of the wheel 41, so the end of the elastic support body 52 cannot be aligned with the position of the concave portion 422 of the ratchet tooth surface 42. In the case where the bending section 521 is not provided, the end of the elastic supporting body 52 will support the side of the convex portion 421 of the ratchet tooth surface 42 and cause the end of the elastic supporting body 52 to bump into the circular protrusion 412 of the wheel 41, which generates mechanical interference and let the wheel unit 4 unable to enter the first position from the second position. Therefore, the bending section 521 having a height higher than the convex portion 421 of the ratchet tooth surface 42 can support the side edge of the convex portion 421 of the ratchet tooth surface 42. When the wheel unit 4 enters the first position from the second position, the bending section 521 of the elastic supporting body 52 pushes against the side edge of the convex portion 421 of the ratchet tooth surface 42 and rotates the wheel 41, so that the elastic support body 52 is aligned with the concave portion 422 of the ratchet tooth surface 42 to successfully enter the ratchet tooth surface 42 and allows the wheel unit 4 to reach the first position.

In addition, the plural guiding ridge 413 radially disposed on the side of the circular protrusion 412 can also provide support to the bending section 521 of the elastic supporting body 52. The plural guiding ridge 413 is matched with the plural convex portions 421. Therefore, when the wheel unit 4 enters the first position from the second position, the bending section 521 of the elastic supporting body 52 touches the plural guiding ridge 413 and rotates the wheel 41, so that the elastic supporting body 52 will be aligned with the position of the recess 422 of the ratchet tooth surface 42 for entrance, and the wheel unit 4 is successfully guided to the first position. During implementation, the plural guiding ridge 413 may not be disposed on the wheel 41, and so should not be construed as limiting the invention.

Figure 10:
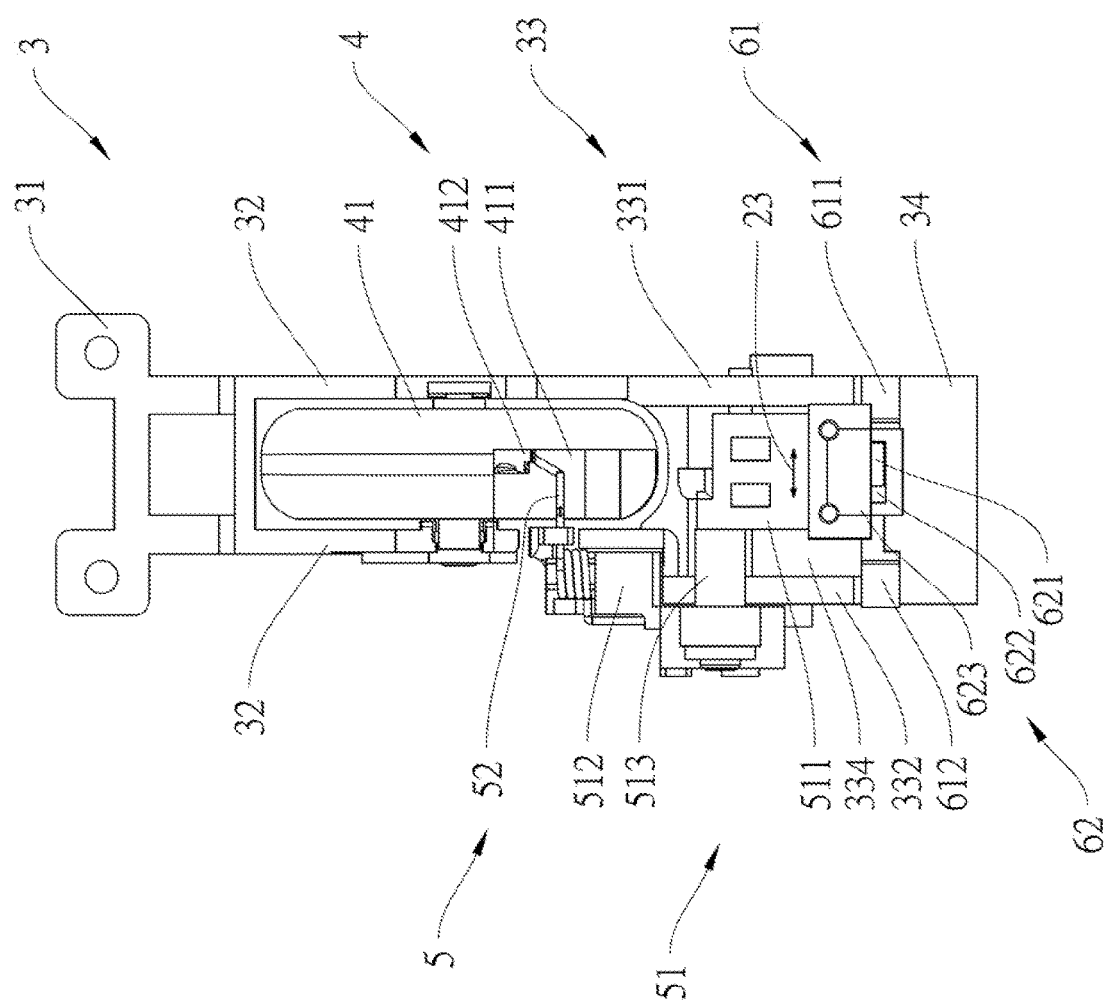
FIG. 10 is a top view illustrating a first position in the preferred embodiment.

Please refer to FIG. 10, a state in which the moving unit 5 is moved rightward to the first position in the translation direction 23, and the first moving portion 511 touches the first partition 331. The second moving portion 512 touches the second partition 332, and protrudes the horizontal rod 333 disposed on the left side of the second partition 332 and enters the second hole 515 of the second moving portion 512. The first magnetic member 611 and the third magnetic member 621 are attracted together. The elastic supporting body 52 touches the ratchet tooth surface 42 and is elastically supported, so that the wheel unit 4 can turn to ratchet mode, and rotate the wheel 41 by fixing the rotational angle. Because the second hole 515 disposed in the second moving portion 512 encloses the horizontal rod 333, the second moving portion 512 can be more stable, and the elastic force supporting body 52 disposed on the second moving portion 512 can stably support the ratchet tooth surface 42.

Figure 11:
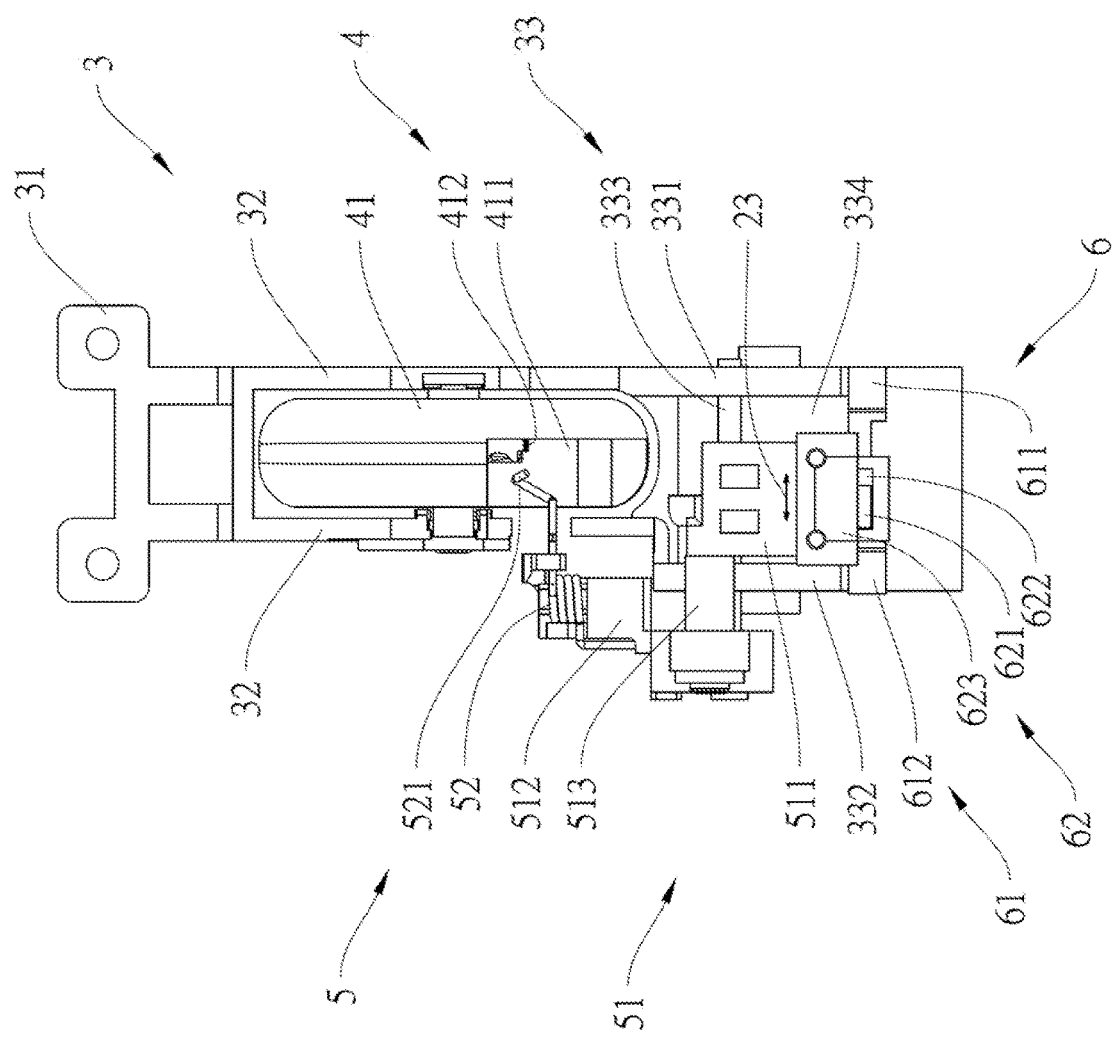
FIG. 11 is a top view illustrating a second position in the preferred embodiment.

Please refer to FIG. 11, a state in which the moving unit 5 is moved leftward to the second position in the translation direction 23, and the first moving portion 511 touches the second partition 332. The second moving portion 512 is separated from the second partition 332, and the second magnetic member 612 and the third magnetic member 621 are attracted together. The elastic supporting body 52 is separated from the ratchet tooth surface 42. The wheel unit 4 is not supported by an external force, so that the wheel unit 4 turns to the free-spin mode, and the wheel 41 rotates without resistance.

Since the third magnetic member 621 is slidable in the notch 622, when the moving unit 5 moves from the first position to the second position, not only the moving unit 5 moves to the left, but also the third magnetic member 621 will slide from the right side position where the first magnetic member 611 is attracted to the left side position where the second magnetic member 612 is attracted. It means that the third magnetic member 621 will quickly move from the right side to the left side of the notch 622, and when the third magnetic member 621 touches the left plate of the notch 622, a tapping sound is made. Similarly, when the moving unit 5 moves from the second position to the first position, not only the moving unit 5 moves to the right, but also the third magnetic member 621 will slide from the left side position where the second magnetic member 612 is attracted to the right position where the first magnetic member 611 is attracted. It means that the third magnetic member 621 will quickly slide from the left side to the right side of the notch 622, and when the third magnetic member 621 touches the right plate of the notch 622, a tapping sound is made. In addition, the magnetic force between third magnetic member 621 and the first magnetic member 611 and the magnetic force between third magnetic member 621 and the second magnetic member 612 provide the mobile unit 5 a pulling back force when the mobile unit 5 leaves the first position or the second position, otherwise provide the mobile unit 5 a pushing force when the moving unit 5 enters the first position or the second position.

From aforementioned descriptions, it is known that the present invention is indeed provided with following benefits:

Able to push a switch: The fixing base 31, the first bracket 32, the second bracket 33, and the pressing seat 34 of the fixing unit 3 are integrally formed. The wheel unit 4 is disposed between the first brackets 32, and the moving unit 5 is disposed between the second brackets 33. Therefore, the wheel 41 of the wheel unit 4 and the mode shift button 53 of the moving unit 5 can provide a function of pressing the switch 22 without affecting the function of the wheel 41 in ratchet mode or in the free-spin mode.

Simple structure for quick switching: The moving unit 5 is disposed on the horizontal rod 333, and can be translated in the translation direction 23, so that the moving unit 5 can be moved between the first position and the second position and the wheel 41 can switch between different modes. Compared to the conventional mouse with fast scrolling module, the present invention has simpler structure, and the movement in the translation direction 23 provides the user the quick switching of the wheel 41.

Easy to use: The first fixing group 61 and the second fixing group 62 of the positioning unit 6 are magnetically attracted together, which enables the moving unit 5 to be fixed to the first position or the second position. Moreover, the user can have a clear click feeling during switching, which is easy to use.

In conclusion, the moving unit 5 is movable relative to the wheel unit 4 in the translation direction 23 to move between the first position and the second position. When the mobile unit 5 is at the first position, the elastic supporting body 52 touches the tooth surface 42, so that the wheel 41 can provide ratchet mode. When the moving unit 5 is at the second position, the elastic supporting body 52 is separated from the tooth surface 42, so that the wheel 41 can provide a free-spin mode, and the user can use the mode shift button 53 to quickly switch to ratchet mode. The user can also flick the wheel 41 or the mode shift button 53 to press the switch 22. The bending section 521 of the supporting body 52 and the plural guiding ridges 413 disposed on the wheel 41 can finely adjust the rotational angle of the wheel 41 when the moving unit 5 moves from the first position to the second position, so that the elastic supporting body 52 can successfully enter the ratchet tooth surface 42 and the moving unit 5 reaches the first position. Therefore, the aforementioned objective can be obtained by the present invention.

Numerous specific details are set forth to provide a thorough understanding of the present invention. However, it will be apparent to one of ordinary skill in the art that the invention may be practiced without these particular details. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

What is claimed is:

1. A wheel device with fast scrolling module comprising:
a fixing unit, which includes a fixing base, a first bracket connected to the fixing base, and a second bracket connected to the first bracket, wherein the fixing unit further includes a pressing seat connected to the second bracket, a convex body disposed on the pressing seat, and a spring body connected to the pressing seat, and wherein the convex body is used to press against a switch, and when the spring body applies an elastic force on the pressing seat, the convex body is separated from the switch;
a wheel unit, which includes a wheel disposed on the first bracket, and a ratchet tooth surface disposed on one side of the wheel, the wheel rotating relative to the first bracket; and
a mobile unit translating relative to the wheel unit in the axial direction of the wheel, which includes a moving body disposed on the second bracket, and an elastic supportive body disposed on the moving body, wherein the mobile unit moving between a first position and a second position, when the mobile unit moving to the first position, the elastic supportive body touching the ratchet tooth surface; when the mobile unit moving to the second position, the elastic supportive body being separated from the ratchet tooth surface.

2. The wheel device with fast scrolling module as claimed in claim 1, wherein the second bracket is provided with a first partition, a second partition spaced from the first partition, and at least one horizontal rod disposed between the first partition and the second partition, and wherein the horizontal rod penetrates the second partition and protrudes, and the moving body is disposed on the horizontal rod.

3. The wheel device with fast scrolling module as claimed in claim 2, wherein the moving body is provided with a first moving portion disposed between the first partition and the second partition, a second moving portion disposed on the outside of the second partition, a connecting portion connected to the first and second moving portion, at least one first hole disposed on the first moving portion, and at least one second hole disposed on the second moving portion, and wherein the horizontal rod passes through the first and second holes, and the elastic supportive body is disposed on the second moving portion.

4. The wheel device with fast scrolling module as claimed in claim 3, wherein the second bracket is further provided with a translation space defined by the first partition and the second partition, and wherein the width of the first moving portion is smaller than the width of the translation space, so that the first moving portion disposed on the horizontal rod is slidable in the translation space, and the elastic supporting body disposed on the second moving portion is moved synchronously with the first moving portion by the connecting portion disposed between the first moving portion and the second moving portion.

5. The wheel device with fast scrolling module as claimed in claim 3, further comprises a positioning unit, which includes a first fixing group disposed on the second bracket, and a second fixing group disposed on the first moving portion, wherein the first and second fixing groups are used for positioning the moving body.

6. The wheel device with fast scrolling module as claimed in claim 5, wherein the first fixing group is provided with a first magnetic member disposed on the second bracket, and a second magnetic member disposed on the second bracket and spaced apart from the first magnetic member, and wherein the second fixed group is provided with a third magnetic member disposed on the first moving portion, when the mobile unit is at the first position, the first magnetic member and the third magnetic member are attracted and fixed together; when the mobile unit is at the second position, the second magnetic member and the third magnetic member are attracted and fixed together.

7. The wheel device with fast scrolling module as claimed in claim 6, wherein the second fixing group is further provided with a notch disposed on the first moving portion, and wherein the notch is configured to contain the third magnetic member, and the width of the notch is greater than the width of the third magnetic member, so that the third magnetic member is slidable in the notch.

8. The wheel device with fast scrolling module as claimed in claim 1, wherein a recess is disposed on a side of the wheel, and a circular protrusion disposed in the recess, and wherein the ratchet tooth surface is disposed on an outer edge of the circular protrusion.

9. The wheel device with fast scrolling module as claimed in claim 8, wherein the tooth surface is provided with a plurality of convex portions arranged at intervals, and a plurality of concave portions respectively disposed between the plural convex portions, and wherein a side of circular protrusion is provided with a plurality of guiding ridges which are radially disposed, and the position of the guiding ridge is matched with the position of the convex portions, and wherein a bending section is extended from the end of the elastic supportive body, and the bending section is used to push against the guiding ridge of the convex portions when the elastic supportive body moves from the second position to the first position, so that the elastic supportive body is guided to the concave portions of the tooth surface.

* * * * *